INVENTOR.
HERMAN ENGEL, JR.

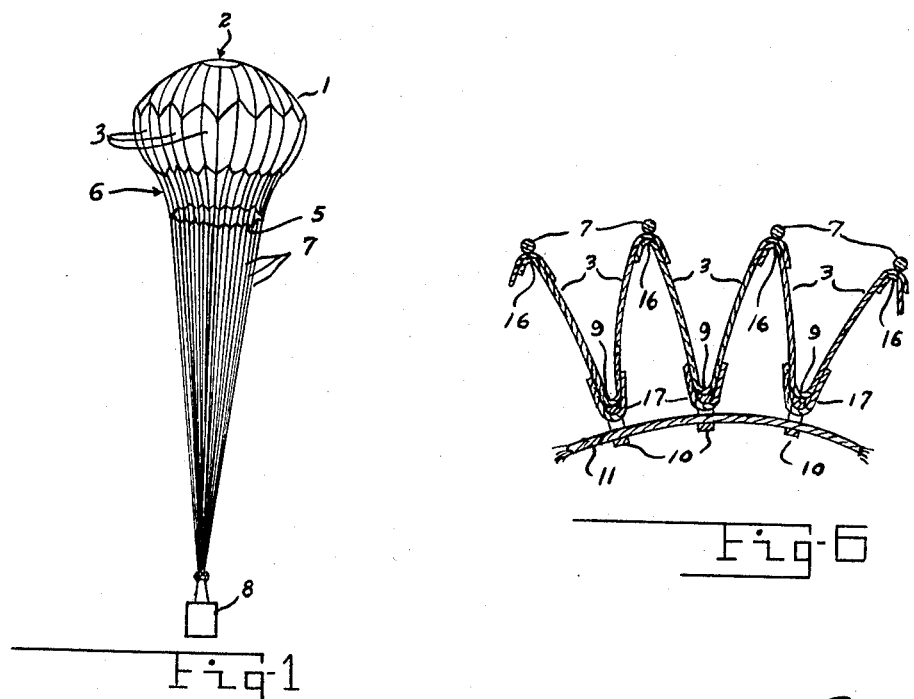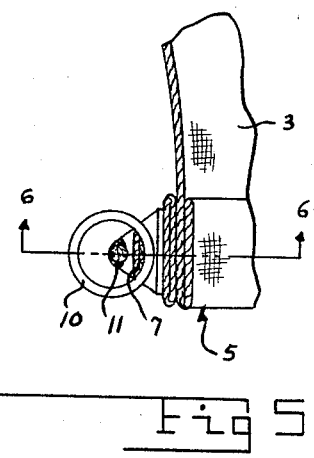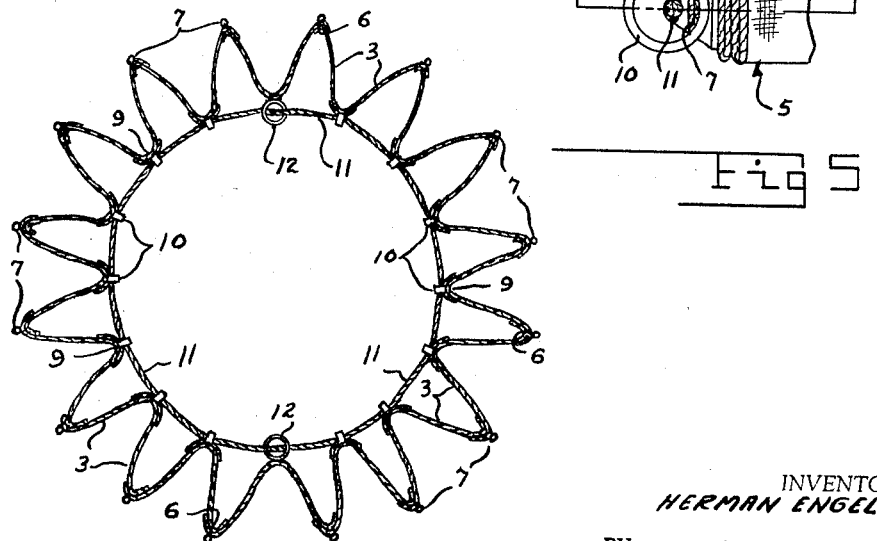

Oct. 11, 1966 H. ENGEL, JR 3,278,143
PARACHUTE CANOPY REEFING AT PANEL CENTERLINES
Filed Jan. 14, 1965 3 Sheets-Sheet 3

INVENTOR.
HERMAN ENGEL, JR.

United States Patent Office 3,278,143
Patented Oct. 11, 1966

3,278,143
PARACHUTE CANOPY REEFING AT PANEL CENTERLINES
Herman Engel, Jr., Dayton, Ohio, assignor to the United States of America as represented by the Secretary of the Air Force
Filed Jan. 14, 1965, Ser. No. 425,642
8 Claims. (Cl. 244—150)

The invention described herein may be manufactured and used by or for the United States Government for governmental purposes without the payment to me of any royalty thereon.

This invention relates to parachutes, and more particularly to improvements in reefing arrangements and mid-panel reefing means, having for objects of the invention means for holding the reefed diameter of a parachute open in a more satisfactory manner, providing more uniform distribution of the shroud lines while reefed and during full deployment, eliminating or reducing conventional reefed canopy flutter, together with the provision of a satisfactory internal mid-panel reefing means for use with parachutes of the conventional solid flat, hemispherical, ribbon, ring sail, and ring slot types, which are workable with a relatively small percent reefed diameter (3% drag area), providing higher drag area when reefed to a given percent while affording faster opening at a given smaller percent reefing, and providing satisfactory reefing and full deployment in parachute cluster or group arrangements. Other objects and advantages of the invention will become apparent from the following description and accompanying drawings in which like reference characters refer to like parts in the several figures.

Drawings

FIG. 1 is a perspective view of a parachute in reefed condition during descent, incorporating the invention.

FIG. 3 is a somewhat diagrammatic bottom plan view of lower or skirt portion of a parachute canopy, such as shown in FIGS. 1 and 2, also showing the canopy in reefed condition during initial deployment, but prior to cutting of the reefing line to permit further full deployment;

FIG. 5 is a fragmentary detail vertical sectional view, taken about on line 5—5 of FIG. 4, showing the mounting of the mid-panel internal reefing rings, and;

FIG. 6 is an enlarged transverse fragmentary sectional view of the skirt portion of a reefed canopy incorporating the invention, taken about on line 6—6 of FIG. 5.

Figure 2:
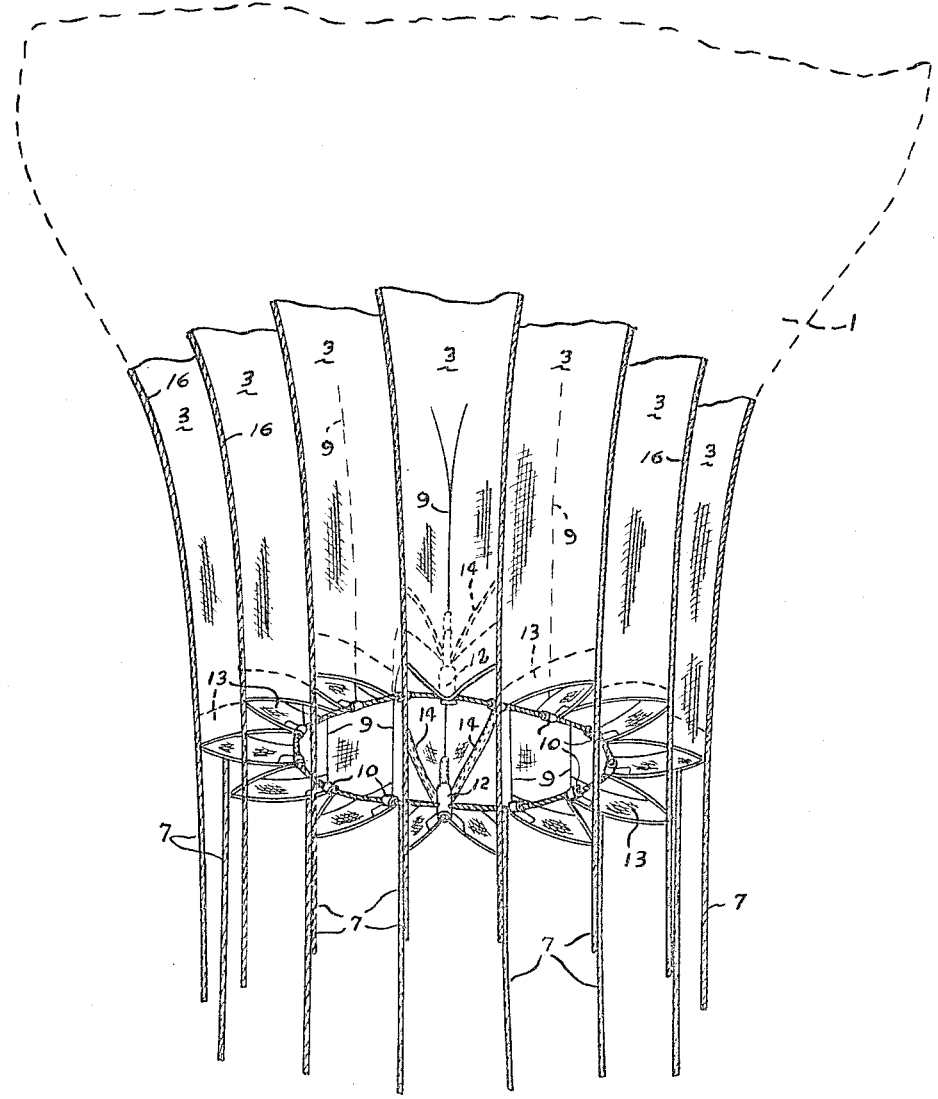
FIG. 2 is an enlarged fragmentary view in perspective, of the skirt portion of one form of parachute employing the invention, looking somewhat upwardly into the interior of the reefed skirt portion to show the improved mid-panel reefing arrangement and one of the conventional time delay reefing line cutters for cutting the reefing line to permit full deployment of the canopy.

Referring to the drawings, and more particularly to FIG. 1, the reference numeral 1 denotes a parachute canopy, of the solid flat type, although the canopy could readily be of the conventional "hemispherical," "ribbon," "ring sail" or "ring slot" types and still satisfactorily incorporate the mid-panel reefing structure of the invention. In the drawings as shown, the reference numeral 2 indicates the apex (or vent) and the radial panels are indicated at 3, radiating outwardly from the apex or vent 2 to the lower or bottom edge 5 of the skirt portion 6.

Conventional shroud or load suspension lines 7 connect the suspended load 8 to the skirt portion 6 at the juncture of the seams between the radial panels 3, namely, at the opposite sides of the outer ends of the panels 3. The shroud lines 7 may extend across the top of the canopy along the seams 16 between the adjacent connected panels 3.

The mid-panel reefing means is mounted inside of the base of the canopy on a reinforcing band 13 around the lower (or bottom) edge portion of the canopy and is shown more particularly in the enlarged fragmentary perspective view of FIG. 2, illustrating the lower portion of a reefed canopy such as depicted in FIG. 1, looking upwardly into the lower or skirt end thereof, the mid or center lines of the gores or panels 3 being indicated at 9.

FIG. 3 shows, somewhat diagrammatically, a bottom plan view of the reefed skirt portion of a canopy incorporating the improved mid-panel reefing structure of the invention in which the reference numerals 10 indicate reefing line guide rings (better seen in FIGS. 4 to 6), through which the reefing line 11 extends, reefing line cutters being indicated at 12 are provided at any desired number of points around the interior of the bottom portion of the canopy, located at mid-points 9 between the side edges of predetermined gores 3. Two cutters 12 only are shown in the drawings located opposite each other and mounted on the reinforcing band 13, being suitably braced in the middle of the panels 3 by reinforcing tapes 14 and 15. The reefing line cutters 12 are of any suitable standard or conventional "time delay" automatic type such as shown in Patent 2,742,697, to R. Gross, dated April 24, 1956, through which the reefing line 11 passes, and they contain a reefing line severing means or knife for severing the reefing line 11 after a predetermined time delay to allow the canopy to subsequently expand or fully deploy. A further example of a reefing line cutter, also internal reefing, is shown in U.S. Patent to F. R. Vlasic, No. 3,049,322, dated August 14, 1962 (as illustrated on sheet 2 thereof).

No inventive novelty is claimed for the reefing line cutter, nor the internal reefing broadly. However, the arrangement of the internal mid-panel reefing of the subject invention has been built and tested, and provides certain important novel and satisfactory improvements over conventional parachute reefing as set forth in the objects of the invention.

Figure 4:
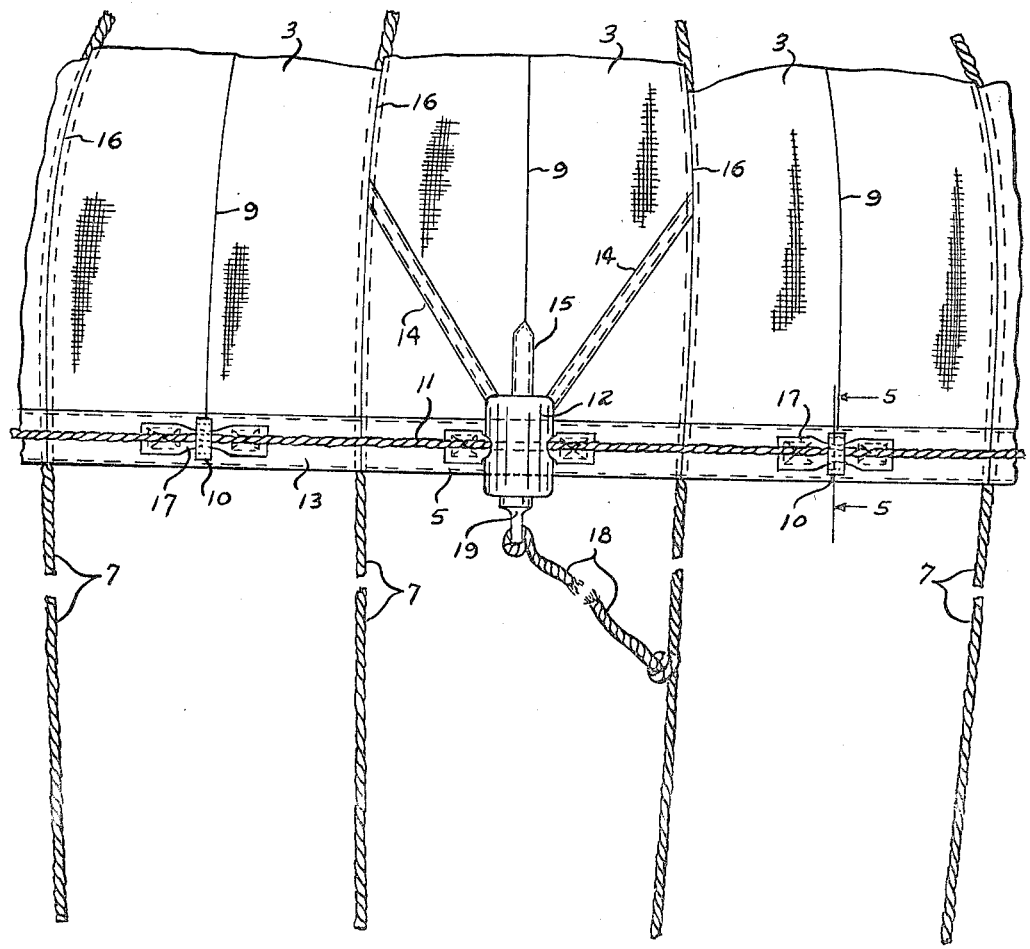
FIG. 4 is an enlarged, fragmentary elevation of the inside of the lower or skirt portion of three adjacent panels or gores of the canopy, showing the mid-panel reefing details, and the mounting thereof, with a reefing line cutter, fixed on the reinforcing band at the inner lower edge of the skirt portion.

Referring back to the drawings, and more particularly to FIGS. 4, 5 and 6, the reefing rings 10 are firmly secured to the reinforcing band 13 and lower inside edge of the canopy at the mid-points 9 between the adjacent connected edges or seams of the panels 16 by strong securing tapes 17.

In a patent to Heinrich, No. 2,520,931, dated September 5, 1950, in FIG. 11, reefing rings are shown which are secured to the base or lower edge of the mid-portions of the gores 20 of the canopy. However, there are important and novel details of construction and advantages in the arrangement of applicant's mid-panel reefing invention which clearly differ from this patent. Applicant's reefing line arrangement is totally different and is located around the interior of the base of the canopy skirt, and in reefed condition allows the gores to expand or extend uniformly outward in reefed condition, and the shroud lines, upon initial deployment, being connected to the panel seams, midway between the reefing line rings uniformly pull the seams of the panels downwardly and outwardly, thus permitting or actually expanding the portions of the canopy between the reefing rings outwardly as seen in FIG. 3. In the Heinrich patent the portions between the rings 22 at the mid-points of the gores are "gathered" together and prevented by the reefing lines from expanding outwardly, thus producing a relatively reduced drag area for a similar reefed area, in comparison with the subject invention.

One conventional method for inffitiating the time delay reefing line cutter 12 into operation is to provide a short "break" cord 18 between one of the shroud lines 7 and the "trigger" 19 for starting the predetermined timing cycle which controls the firing of the time delay explosive squib and operates the cutter or knife to sever the reefing line, after a desired time delay.

Preliminary deployment of the chute causes the shroud lines to be extended, pulling and breaking the line 18 to fire the squib.

Of course, when the reefing line is cut the canopy is allowed to expand to its full drag area diameter, but prior to that time, following initial deployment, as seen in FIGS. 1 to 3, and 6, the portions of the canopy between the mid-points around the canopy, being connected by the shroud lines 7, are free to expand outwardly (as seen in FIGS. 2 and 3) in a uniformly even manner under control of the shroud lines and not only reduced or eliminate the conventional flutter but increase the effective relative drag area, and are in position to immediately and quickly fill and expand the canopy to its full drag area diameter. The reefed area can be much smaller with increased dependability, with applicant's mid-panel reefing, because the "reefed" area is held in position for "filling" by the shroud lines. This reefed area can be as small as 3% of the total unreefed drag area and still "fill" satisfactorily when unreefed. This is not true where the reefing lines extend around the exterior of the canopy, or are connected to the canopy at the junctures of the panel seams and shroud lines, leaving the reefed area between the reefing line rings to flutter, or collapse, or be gathered up by the reefing lines, as is true of most conventional canopy reefing means in use today.

As before mentioned, the mid-panel reefing arrangement of the invention is shown in connection with a "solid" fabric circular flat type canopy, however, it is equally applicable to substantially all types of parachute canopies in which the shroud lines are connected around the canopy to the skirt at equal circumferentially spaced points, and provides internal reefing with the reefing rings disposed around the inside edge of the base of the skirt, midway between each pair of adjacent shroud lines. This applies to the conventional solid flat, hemispherical, ribbon, ring sail, and ring slot types of canopies.

For purposes of exemplification, a particular embodiment of the invention has been shown and described to the best understanding thereof, however it will be apparent that changes and modifications in the arrangement and construction of the parts thereof may be resorted to without departing from the true spirit and scope of the invention as defined in the following claims.

I claim:

1. A reefable parachute comprising, a canopy, load suspension shroud lines connected to the lower edge portion of the canopy in substantially uniform circumferentially spaced relation around the skirt portion, converging downwardly for suspension of a load at the lower ends thereof, reefing line retainer guide members fixed to the inside of the lower edge portion of the skirt portion, substantially midway between each adjacent pair of shroud lines, a reefing line slidably extending through said retainer guide members around the inside of the canopy inside of the confines of said shroud lines for releasably reefing the skirt portion of the canopy down to a predetermined drag area with the portions of the skirt connected intermediate the retainer guide members to the shroud lines free to move outwardly during reefed condition under control of said shroud lines, and time delay reefing line cutter means fixed to the skirt portion for severing the reefing line to permit unreefed full deployment of the canopy from the reefed condition after a predetermined time delay.

2. A reefable parachute comprising, a canopy, load suspension shroud lines connected in substantially uniform circumferentially spaced relation to each other around the outside of the lower edge of the skirt portion of the canopy and converging downwardly toward each other for the suspension of a load at the lower ends thereof during deployment and descent of the parachute, reefing line guide ring members fixed to the inside of the lower edge portion of the canopy skirt in substantially uniform circumferentially spaced relation between the locations of adjacent shroud lines, reefing line means extending around the inside of said skirt portion in slidable relation through said guide ring members, tensioned for releasably reefing the skirt portion of the canopy, inside of the shroud lines to a predetermined initial drag area with the portions of the skirt between the ring members and connected to the shroud lines, free to extend outwardly under control of the shroud lines, and time delay reefing line cutter means fixed inside of the canopy skirt portion for severing the reefing line after a predetermined time delay following reefed deployment of the parachute, to free said reefing line guide ring members to permit full unreefed deployment of the canopy after a predetermined time delay following initial reefed deployment of the canopy.

3. A reefable parachute comprising, a canopy having a skirt portion and a descent axis comprising, a plurality of radial panels or gores evenly disposed in adjoining connected relation around said descent axis, load suspension shroud lines connecting the exterior of the skirt portion at the adjoining portions of said panels and depending downwardly for suspension of a load at the lower ends thereof of the canopy during deployment and descent of the parachute, reefing line guide ring members fixed to the inside of the skirt portion of the canopy midway between the opposite radial edges of the panels and midway between the connected load suspension shroud lines at the opposite edges of the panels, a reefing line extending around the inside of the skirt portion of the canopy in slidable relation through said guide ring members for reefing the skirt portion of the canopy, inside of the confines of said shroud lines, to a predetermined reduced drag area, with the adjacent adjoining skirt portions of the canopy between the reefing line guide ring members and the connected shroud lines free to expand outwardly between the locations of the guide ring members, and means for severing said reefing line following reefed deployment of the canopy, to permit subsequent unreefed full deployment and descent of the canopy, under control of said shroud lines.

4. A reefable parachute canopy having a skirt portion and a central descent axis, comprising a plurality of adjoining radial panels, shroud lines connecting the skirt portion of the canopy at the juncture between the adjoining radial panels for suspension of a load during deployment of the canopy and descent thereof, means for reefing the canopy between the shroud lines comprising reefing line retaining guide rings fixed to the inside of the skirt portion of the canopy midway between the opposite radial edges of the panels, and a reefing line of predetermined length extending through said guide rings around the inside of the said skirt portion inside the confines of the shroud lines for reefing the skirt portion of the canopy to a predetermined minimum drag area with the portions of the adjacent panels between the reefing ring locations free to expand outwardly away from the reefing rings during descent of the canopy whereby the shroud lines connected to said adjacent portions retain the same in uniform expanded relation around the canopy, and means for severing the reefing line to unreef the canopy and permit full deployment thereof under control of said shroud lines.

5. A reefable parachute comprising, a canopy, load suspension shroud lines connected to the lower edge portion of the canopy in substantially uniform circumferentially spaced relation, around the skirt portion, converging downwardly for suspension of a load at the lower ends thereof, reefing line ring members fixed to the inside of the lower edge portion of the skirt midway between each adjacent pair of shroud lines, a reefing line extending around the inside of the canopy through said reefing line ring members for releasably reefing the skirt of the canopy to a predetermined drag area with the portions of the skirt connected by the shroud lines intermediate the reefing ring members free to move outwardly under control of the shroud lines, and time delay means for severing the reefing line to permit unreefed full deployment of the canopy from the reefed condition after a predetermined time delay.

6. A reefable parachute comprising a canopy having a central descent axis and a plurality of radial panels spaced circumferentially around said descent axis in adjoining relation, load suspension shroud lines extending from the adjacent outer opposite sides of said panels for suspension of a load by the canopy during the deployment and descent thereof, a reefing line of predetermined length extending around the inner surface of the canopy adjacent the outer ends of the panels, reefing line guide rings secured to the inner surface of the outer ends of the panels midway between the opposite side edges of the panels, through which said reefing line extends, for reefing the canopy to a predetermined diameter at the midpoints of the outer ends of the radial panels, within the confines of the shroud lines, and means for severing said reefing line to release said reefing line and allow the canopy to fully deploy to its maximum drag diameter.

7. A reefable parachute comprising a canopy having a descent axis and an annular skirt portion, a multitude of load suspension shroud lines connected to the skirt portion of the canopy in uniform circumferentially spaced relation to each other around the lower edge of said skirt portion, said shroud lines converging downwardly during descent of the canopy and adapted to be connected at their lower ends to a load to be suspended and lowered by the canopy, reefing line guide rings fixed to the inner surface of the skirt portion of the canopy intermediate the connections of the shroud lines to the skirt portion, adjacent the lower edge of the skirt portion, and within the confines of the multitude of shroud lines, a reefing line of predetermined length extending around the inner surface of the lower portion of the skirt of the canopy through said reefing rings and within the confines of the shroud lines for reefing the canopy to a predetermined initial drag area, while allowing the skirt portions of the canopy between the reefing line rings and connected to the shroud lines to deflect outwardly and be drawn downwardly in substantially uniform fashion by said shroud lines, and means for severing said reefing line to free the portions of the skirt of the canopy between the shroud lines, to allow the canopy to fully deploy to its maximum drag area.

8. A reefable parachute comprising a canopy having a descent axis and an annular skirt portion, a multitude of load suspension shroud lines connected to the exterior of the canopy skirt portion in uniform circumferentially spaced relation to each other around the lower edge of said skirt portion and adapted to converge downwardly toward said descent axis for the suspension and descent of a load connected thereto, reefing line guide ring means fixed to the inner surface of the skirt portion of the canopy adjacent the lower edge thereof at points midway between each of said adjacent spaced shroud line points of connection and located inside of confines of the shroud lines, a reefing line of predetermined length extending through said guide ring members around the inside of the skirt portion of the canopy for reefing the skirt portion of the canopy from the inside to a predetermined reefed drag area, with the skirt portion of the canopy between the reefing ring means free to deflect outwardly by the air stream during the descent of the canopy, with the shroud lines connected to the deflected portions midway between the reefing line guide ring members drawing the deflected portions downwardly, time delay reefing line cutter means carried at the inner surface of said skirt portion for severing the reefing line to allow the reefing line to "run free" in said reefing guide ring means to permit the canopy to expand to its full deployment drag area, and means connected between said time delay reefing line cutter means operable by deployment and extension of said shroud lines for initiating said reefing line cutter means into operation for subsequent cutting of said reefing line.

References Cited by the Examiner

UNITED STATES PATENTS

| | | | |
|---|---|---|---|
| 2,520,931 | 9/1950 | Heinrich | 244—152 |
| 3,049,322 | 8/1962 | Vlasic | 244—152 |
| 3,173,636 | 3/1965 | Sepp | 244—145 |

MILTON BUCHLER, *Primary Examiner.*

A. E. CORRIGAN, *Assistant Examiner.*